United States Patent
Furusho et al.

[11] Patent Number: 6,134,509
[45] Date of Patent: Oct. 17, 2000

[54] ROAD CURVATURE ESTIMATING APPARATUS

[75] Inventors: Hiroyuki Furusho, Kanagawa; Hiroshi Mouri, Yokohama, both of Japan

[73] Assignee: Nissan Motor Co., Ltd., Kanagawa, Japan

[21] Appl. No.: 09/013,303

[22] Filed: Jan. 26, 1998

[30] Foreign Application Priority Data

Jan. 27, 1997 [JP] Japan ................................ 9-012817

[51] Int. Cl.[7] .................................................. G06F 19/00
[52] U.S. Cl. ................................ 702/167; 701/28; 701/41
[58] Field of Search ................................ 702/167; 701/1, 701/23, 28, 36, 41, 116

[56] References Cited

FOREIGN PATENT DOCUMENTS 4-283900  10/1992  Japan .

*Primary Examiner*—Patrick Assouad
*Attorney, Agent, or Firm*—McDermott, Will & Emery

[57] ABSTRACT

A road curvature estimating apparatus for a vehicle includes a vehicle attitude detector which detects an attitude of the vehicle with respect to a road, a front-and-rear wheel steer-angle detector, a vehicle speed detector and a road curvature calculator. The road curvature calculator calculates a curvature of a road ahead of the vehicle on the basis of the measured vehicle attitude, the measured vehicle speed and the measured steer angles of the front and rear wheels by means of a state estimation of modern control theory. A controller executes a control of an automatic steering mechanism on the basis of the road curvature calculated.

10 Claims, 10 Drawing Sheets

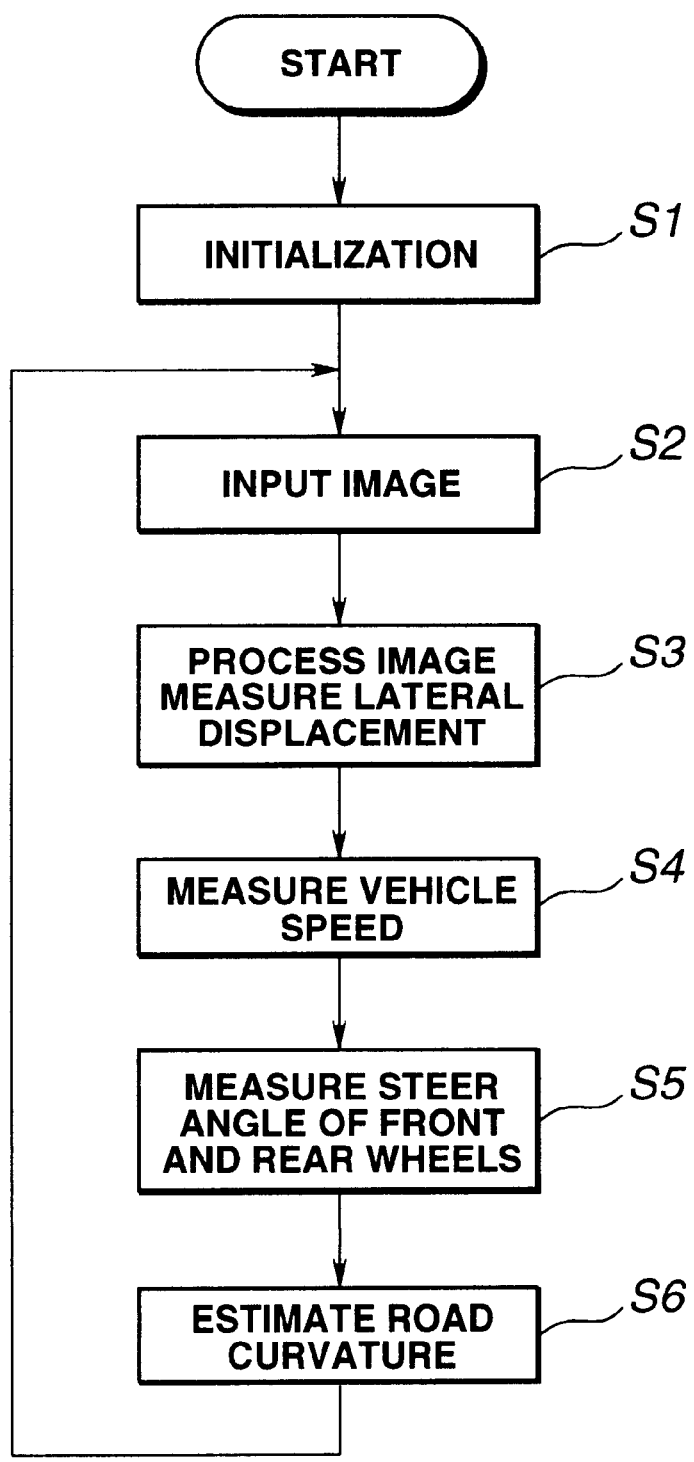

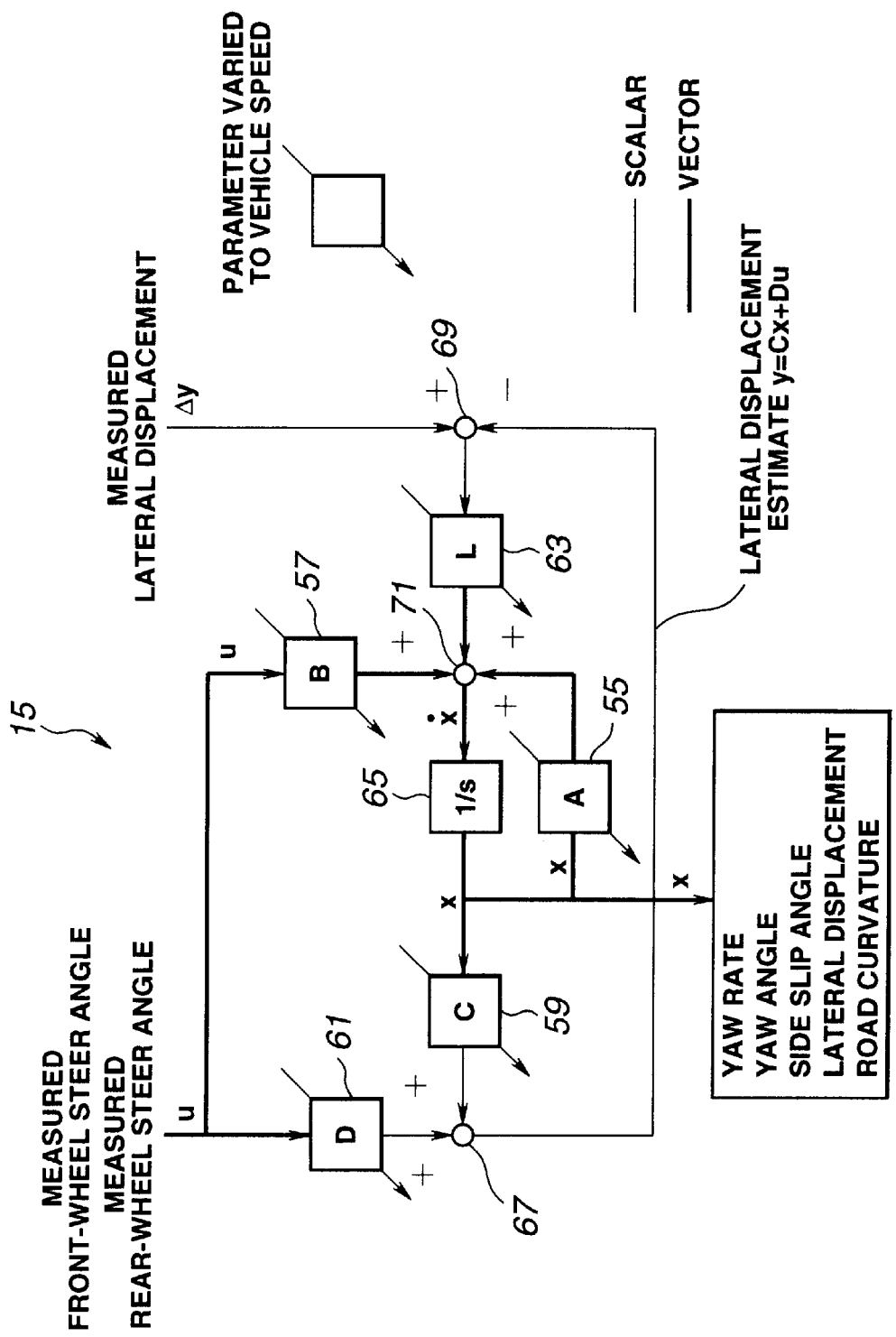

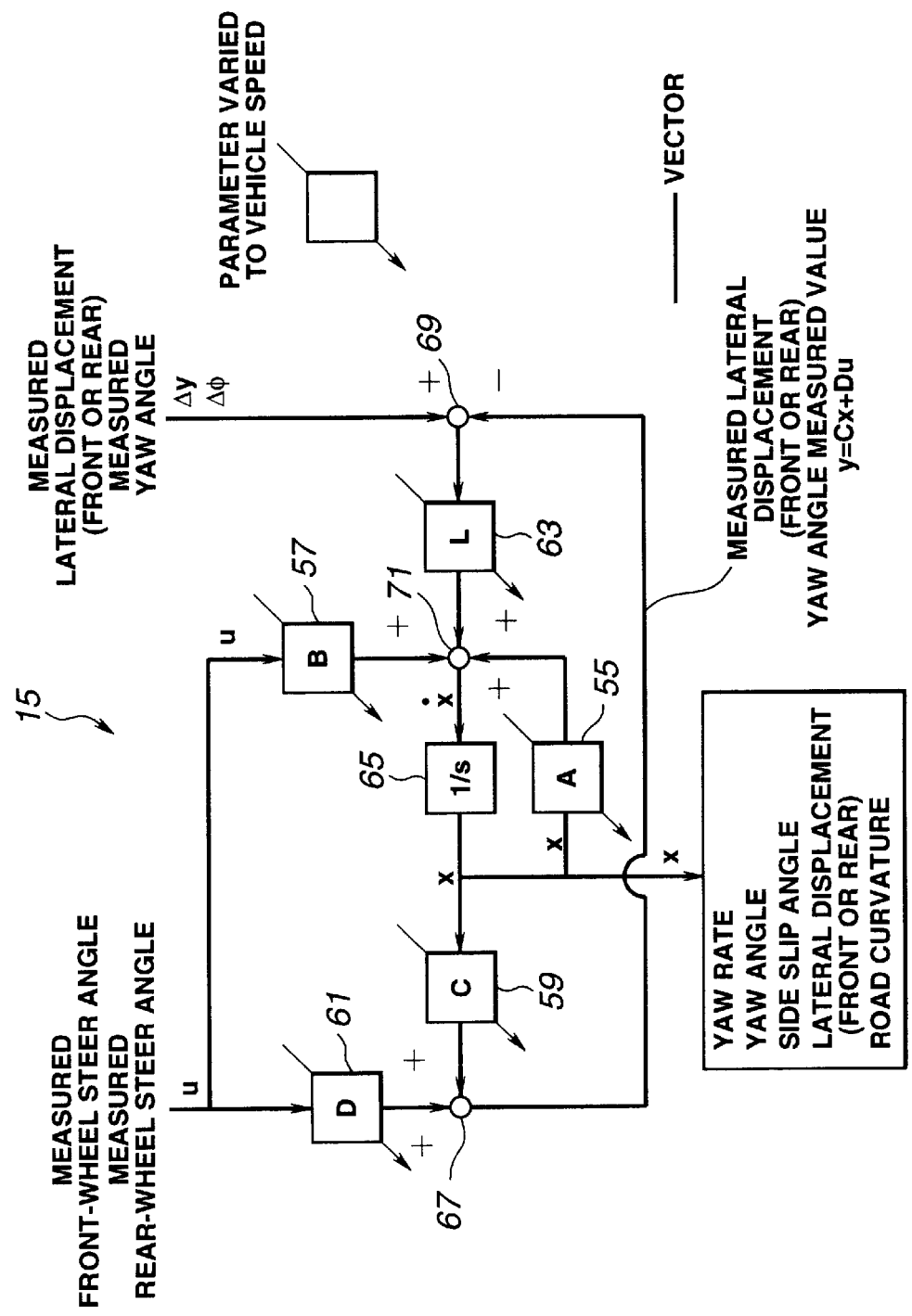

ROAD CURVATURE ESTIMATING APPARATUS

BACKGROUND OF THE INVENTION

The present invention relates to a road curvature estimating apparatus for estimating a curvature of a road ahead of a vehicle.

Japanese Patent Provisional Publication No. 4-283900 discloses a conventional road curvature estimating apparatus which includes an image device for taking a variable bright density picture of a surface of a road ahead of a vehicle. The picture taken by the image device is supplied to a bright change detecting device so as to obtain the bright change amount of each picture element from a bottom portion to an upper portion of the picture of the image device. The bright change detecting device selects the picture element which has the bright change amount larger than a predetermined amount and is nearest to that of the bottom portion. The picture element obtained at the bright change detecting device is sent to a world coordinate system detecting device to obtain a position of the picture element in an actual world coordinate system. A curve detecting device obtains a curvature and a radius of the road from the actual world coordinate of the bright change element which obtained in the world coordinate system detecting device. The obtained information is supplied to a display device so as to inform a result of the road detected shape to a driver.

However, this conventional curvature estimating apparatus is arranged to take a variable density picture of a road ahead of the vehicle and to execute the coordinate transformation of the curve from the bright change amount. This requires to execute the calculations as to the large amount of picture elements and therefore remarkably increases the time for the calculation. Accordingly, in case that an automatic steering control of the vehicle is executed by utilizing the road curvature estimated by the apparatus, it may happen to generate the delay of the calculation as to a traveling vehicle and to put the control of the vehicle unstable. Therefore, the conventional apparatus is required to compensate the delay by taking the variable density picture of a further distant place of the road. Further, in case that it is necessary to take the variable density picture of the road including a distant place, the picture of a road width at the distant place is represented by a smaller number of the picture elements although the picture of the same road width at the near place is represented by a large number of the picture elements. This degrades the resolution of the picture. Furthermore, since the conventional apparatus is arranged to obtain a line along a road lane such as a white line on the road by means of a polynominal approximation and to calculate the curvature on the basis of the obtained result, the number of the data points of the picture becomes large and thereby increases the time for the calculating process. Therefore, the control of the vehicle may become unstable by the delay of the calculation.

SUMMARY OF THE INVENTION

It is an object of the present invention to provide a road curvature estimating apparatus which enables a quick calculation of a road curvature by limiting the image processing and enables the stable control.

An aspect of the present invention resides in a road curvature estimating apparatus which comprises a lateral displacement measuring section, a wheel steer angle measuring section, a vehicle speed measuring section, and a road curvature calculating section. The lateral displacement measuring section measures a lateral displacement of a vehicle with respect to a road. The wheel steer angle measuring section measures steer angles of front and rear wheels of the vehicle. The vehicle speed measuring section measures a vehicle speed of the vehicle. The road curvature calculating section calculates a curvature of a road ahead of the vehicle on the basis of the measured lateral displacement, the measured vehicle speed and the measured steer angles of the front and rear wheels by means of a state estimation of modern control theory.

Another aspect of the present invention resides in a road curvature estimating apparatus installed in a vehicle. The road curvature estimating apparatus comprises a vehicle attitude detector, a wheel steer angle detector, a vehicle speed detector, a road curvature calculator and a monitor. The vehicle attitude detector detects an attitude of the vehicle with respect to a road. The wheel steer angle detector detects steer angles of front and rear wheels of the vehicle. The vehicle speed detector detecting a vehicle speed of the vehicle. The road curvature calculator calculating a curvature of a road ahead of the vehicle on the basis of the measured lateral displacement, the measured vehicle speed and the measured steer angles of the front and rear wheels by means of a state estimation of modern control theory. The monitor displays the calculated road curvature to inform it to a driver of the vehicle.

BRIEF DESCRIPTION OF THE DRAWINGS

FIG. 2 is a flowchart of an estimating process executed by the road curvature estimating apparatus of the first embodiment.

FIG. 3 is a block diagram of a road curvature calculator of the first embodiment.

FIG. 10 is a block diagram of the road curvature calculator employed in a third embodiment.

DETAILED DESCRIPTION OF THE INVENTION

Referring to FIGS. 1A to 4, there is shown a first embodiment of a road curvature estimating apparatus 1 according to the present invention.

Figure 1A:
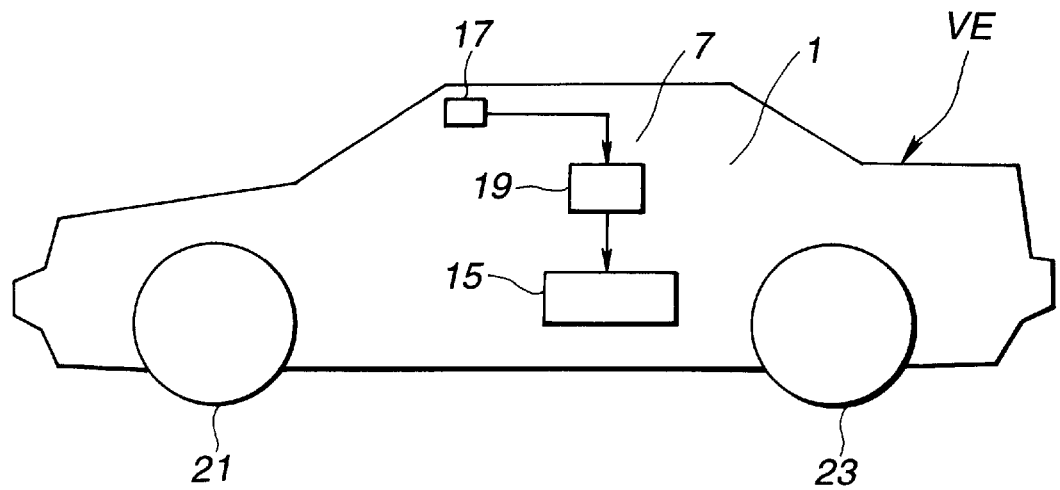
FIG. 1A is a schematic structural view of an automotive vehicle equipped with a road curvature estimating apparatus of a first embodiment according to the present invention, as viewed from a side direction.
Figure 1B:
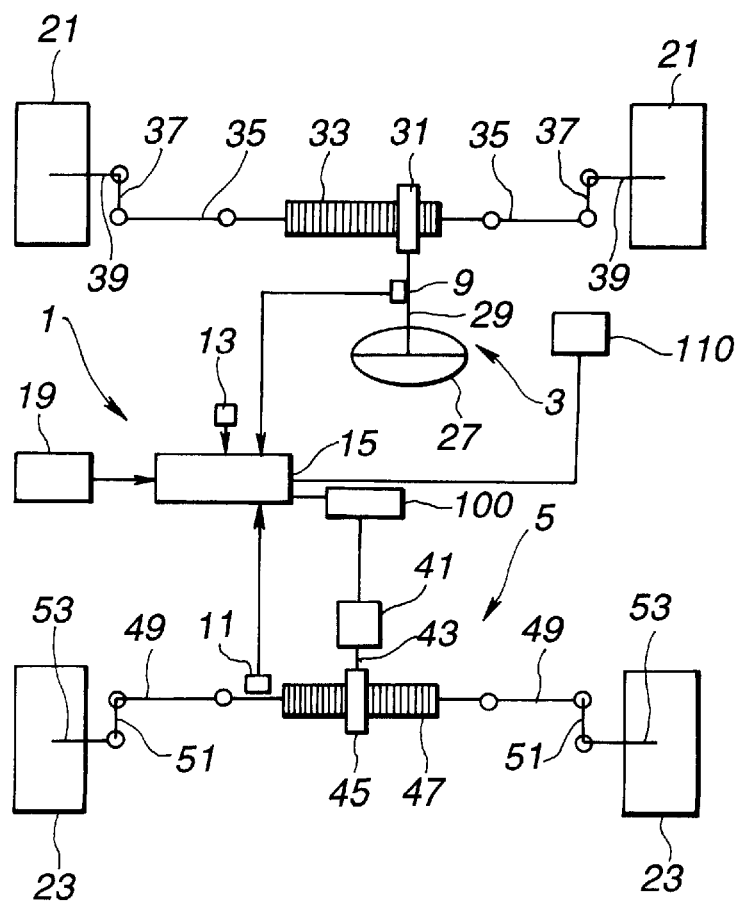
FIG. 1B is a schematic structural view of the automotive vehicle of FIG. 1A as viewed from a top direction.

As shown in FIGS. 1A and 1B, an automotive vehicle VE is provided with a manual steering mechanism 3 and an automatic steering mechanism 5. The road curvature estimating apparatus 1 of the first embodiment comprises a lateral displacement measuring means 7, a front wheel steer angle sensor 9, a rear wheel steer angle sensor 11, a vehicle speed sensor 13 and a road curvature calculator 15. The front wheel steer angle sensor 9 and the rear wheel steer angle sensor 11 function as a front and rear wheel steer angle measuring means. The vehicle speed sensor 13 functions as a vehicle speed measuring means, and the road curvature calculator 15 functions as a road curvature calculating means.

The lateral displacement measuring means 7 measures a lateral displacement of the automotive vehicle VE with respect to a road on which the automotive vehicle VE is traveling. The lateral displacement means 7 is constituted by a CCD (charge coupled device) camera 17 for taking images of a forward view from the automotive vehicle VE and an image processing device 19. The image taken by the CCD camera 17 is sent to the image processing device 19. The image processing device 19 calculates the lateral displacement at the forward gazing point on the basis of the image from the CCD camera 17. Further, the image processing device 19 sends it to the road curvature calculator 15 as the measured value of the lateral displacement of the automotive vehicle VE with respect to the road. The lateral displacement at the forward gazing point is a lateral direction displacement of a forward predetermined distance point on a centerline of the automotive vehicle VE in the lateral direction with respect to a lane marker such as a white line.

The front wheel steer angle sensor 9 is arranged to measure the steer angle of the front right-and-left wheels 21 and inputs it to the road curvature calculator 15. The rear wheel steer angle sensor 11 is arranged to measure the steer angle of the rear right-and-left wheels 23 and inputs it to the road-curvature calculator 15. The vehicle speed sensor 13 is arranged to measure a vehicle speed of the automotive vehicle VE and inputs it to the road curvature calculator 15.

The road curvature calculator 15 calculates the road curvature by the state estimation of the modern control theory on the basis of the measured lateral displacement, the front and rear wheel steer angles and the vehicle speed. The calculated road curvature is inputted to a controller 100 for executing an automatic steering and to a display 110 through which the calculated road curvature is informed to a driver of the automotive vehicle VE.

The manual steering mechanism 3 includes a front-wheel pinion gear 31 connected to a lower end portion of a steering shaft 29. The other end portion of the steering shaft 29 is connected to a steering wheel 27. The front-wheel pinion gear 31 is engaged with a front-wheel rack 33 which is supported to a not-shown vehicle-body rack housing so as to be able to move side by side (translation) in the right and left directions. Interconnected with both ends of the front-wheel rack 33 is a pair of front-wheel side rods 35. Each of front-wheel side rods 35 is interconnected with each front-wheel axle 39 through a front-wheel knuckle arm 37. Each of the right-and-left front wheels 21 is supported to the front-wheel axle 39. The front wheel steer angle sensor 9 is disposed in the vicinity of the steering shaft 29 so as to detect the rotation angle of the steering shaft 29.

The automatic steering mechanism 5 is arranged to execute an automatic steering by controlling an electric motor 41 by means of the controller 100 on the basis of travel circumstantial information such as the vehicle speed, a vehicle distance to a preceding vehicle and the lateral displacement at the forward gazing point. Further, when the automotive vehicle VE travels a curving road, the road curvature calculator 15 calculates the road curvature on the basis of the measured lateral displacement, the front and rear wheel steer angles and the vehicle speed by means of the state estimation of the modern control theory. The automatic steering is executed by inputting the output of the road curvature calculator 15 to the controller 100.

The automatic steering mechanism 5 includes a rear-wheel pinion gear 45 connected to an output shaft 43 of the electric motor 41. The rear-wheel pinion gear 45 is engaged with a rear-wheel rack 47 which is supported to a not-shown vehicle-body rack housing so as to be able to move side by side (translation) in the right and left directions. Interconnected with both ends of the rear-wheel rack 47 are a pair of rear-wheel side rods 49 which are interconnected with a pair of rear-wheel axles 53 through a rear-wheel knuckle arms 51c, respectively. The rear wheels 23 are supported to the rear-wheel axles 53, respectively. The rear wheel steer angle sensor 11 is disposed in the vicinity of the rear-wheel rack 47 so as to detect the left-and-right translation amount of the rear-wheel rack 47.

The manual steering mechanism 3 is arranged such that the front-wheel rack 33 executes the translational motion in the left or right direction according to the rotation of the front-wheel pinion gear 31 generated by the left or right steering of the steering wheel 27. The translational motion is transferred to the front-wheel side rods 35 and the front-wheel knuckle arms 37, and therefore the left and right front wheels 21 are steered into the steered direction through the front-wheel axles 39. When the automatic steering is selected by means of a selector means, the controller 100 executes the automatic steering by controlling the electric motor 41 upon receiving the travel circumstantial information such as the lateral displacement, the front and rear wheel steer angles, and the vehicle speed. At this time, the manual steering mechanism 3 is fixed at a neutral position where the steer angle is zero, and therefore the automatic steering is executed by the steering of the automatic steering mechanism 5.

By driving the electric motor 41, the rear-wheel pinion gear 45 is rotated through the output shaft 43, and the rear-wheel rack 47 executes a translational motion in the left or right direction through the rotation of the rear-wheel pinion gear 45. Further, the translational motion is transferred to the rear-wheel side rods 49 and the rear-wheel knuckle arms 51, and therefore the left and right rear wheels 23 are steered through the rear-wheel axles 53. The travel circumstantial information is detected by the CCD camera 17 and the vehicle speed sensor 13.

During the automatic steering operation, the road curvature calculator 15 executes a flowchart shown FIG. 2 so as to smoothly execute the traveling on the curved road.

At a step S1, the road curvature calculator 15 executes an initialization process for initializing each section.

At a step S2, the road curvature calculator 15 executes an image sensing process. During this process, the image taken by the CCD camera 17 is sent to the image processing device 19.

At a step S3, the road curvature calculator 15 executes the image process and the lateral displacement measuring process. During these processes, the lateral displacement at the forward gazing point with respect to a lane marker such as a while line of the road is calculated by the image processing device 19 and is sent to the road curvature calculator 15.

At a step S4, the road curvature calculator 15 executes the vehicle speed measuring process in which the vehicle speed sensor 13 measures a signal indicative of the vehicle speed, and the measured signal is sent from the vehicle speed sensor 13 to the road curvature calculator 15.

At a step S5, the road curvature calculator 15 executes the front and rear wheel steer angle measuring process so that the front and rear wheel steer angle sensors 9 and 11 measure signals indicative of the front and rear wheel steer angles, and the measured signals are sent from the front and rear wheel steer angle sensors 9 and 11 to the road curvature calculator 15.

At a step S6, the road curvature calculator 15 executes the road curvature estimating process. That is, the road curvature calculator 15 calculates (estimates) the road curvature on the basis of the measured lateral displacement, the front and rear wheel steer angles, and the vehicle speed. As a result of this road curvature calculation, the automatic steering is smoothly executed even during a traveling on a curved road by controlling the electric motor 41 by the controller.

Next, the modern control theory employed to the road curvature calculator 15 will be discussed with reference to FIG. 3.

As shown in FIG. 3, the road curvature calculator 15 is provided with a first coefficient multiplier 55, a second coefficient multiplier 57, a third coefficient multiplier 59, a fourth coefficient multiplier 61, a fifth coefficient multiplier 63, an integrator 65 and adders 67, 69 and 71. Reference marks A, B, C, D and L of the respective coefficient multipliers 55, 57, 59, 61 and 63 represent matrixes.

In the first embodiment, the road curvature is approximated by a linear system driven by white noises, and each matrix is determined as follows by adapting this approximation. That is, by employing a two-wheel model, which is generally employed for studying the steering stability, as a vehicle model, the equations of the vehicle model are shown as follows.

$$\frac{d}{dt}\begin{bmatrix} r \\ \beta \\ \Delta\Psi \\ \Delta y \end{bmatrix} = \begin{bmatrix} a_{11} & a_{12} & 0 & 0 \\ a_{21} & a_{22} & 0 & 0 \\ 1 & 0 & 0 & 0 \\ 1s & v & v & 0 \end{bmatrix}\begin{bmatrix} r \\ \beta \\ \Delta\Psi \\ \Delta y \end{bmatrix} + \begin{bmatrix} b_{11} & b_{12} \\ b_{21} & b_{22} \\ 0 & 0 \\ 0 & 0 \end{bmatrix}\begin{bmatrix} \partial f \\ \partial r \end{bmatrix} + \begin{bmatrix} 0 \\ 0 \\ -v \\ 0 \end{bmatrix}\rho \quad (1)$$

$$\Delta y = \begin{bmatrix} 0 & 0 & 0 & 1 \end{bmatrix}\begin{bmatrix} r \\ \beta \\ \Delta\Psi \\ \Delta y \end{bmatrix} \quad (2)$$

wherein $\rho$ is the road curvature, $\gamma$, $\beta$, $\Delta\Psi$, $\Delta y$ and v represent the yaw rate, the later slip angle, the yaw angle, the lateral displacement and the vehicle speed, respectively, and a11 to b22 are determined by the set condition of the automotive vehicle VE and are coefficients satisfying the following equations.

$$a_{11} = \frac{-(cr \cdot lr^2 + cf \cdot lf^2)}{iz \cdot v} \quad (3)$$

$$a_{12} = \frac{(cr \cdot lr - cf \cdot lf)}{iz}$$

$$a_{21} = -1 + \frac{(cr \cdot lr - cf \cdot lf)}{m \cdot v^2}$$

$$a_{22} = \frac{-(cf + cr)}{m \cdot v}$$

$$b_{11} = \frac{cf \cdot lf}{iz}$$

$$b_{12} = \frac{-cf \cdot lr}{iz}$$

$$b_{21} = \frac{cf}{m \cdot v}$$

$$b_{22} = \frac{cr}{m \cdot v}$$

wherein cf(cr) is the sum of the cornering stiffness of front (rear) two wheels, lf(lr) is a distance from the gravity point of the automotive vehicle VE to the front (rear) axis, iz is the yawing inertia, and m is a mass of the automotive vehicle VE.

On the other hand, the curvature $\rho$ of the road is approximated by the linear system model driven by the white noises as follows.

$$\rho = -\lambda + v \quad (4)$$

Since the curvature $\rho$ of the road with respect to the traveling vehicle VE changes according to the past condition of the traveled road, it is defined as a constant term of ($-\lambda s$). Since the change of the curvature $\rho$ of the road ahead of automotive vehicle VE is random, (v) is added to the equation as a disturbance. That is, $\lambda$ is a constant, and v is white noises.

Figure 4:
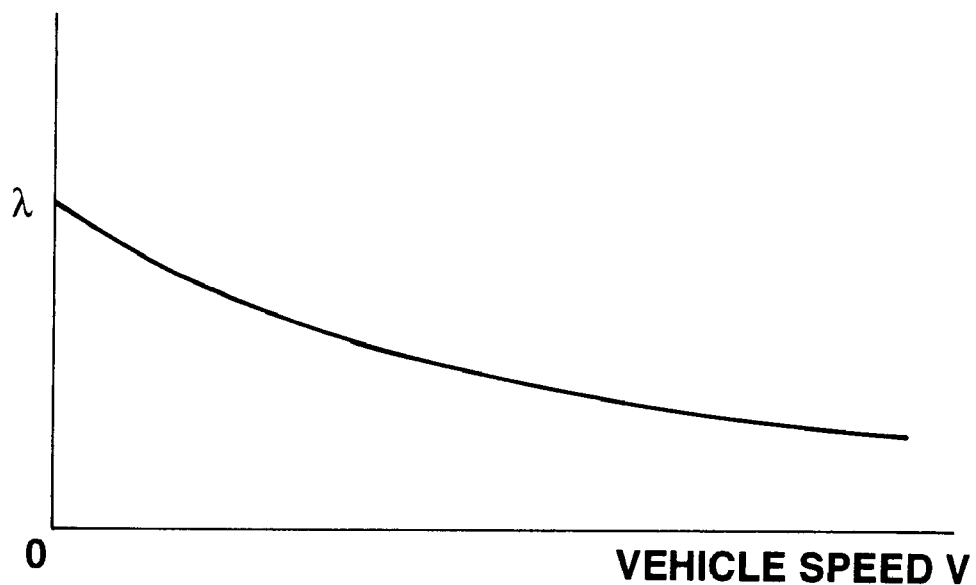
FIG. 4 is a graph which shows a relationship between a constant λ and the change of the vehicle speed.
Figure 5A:
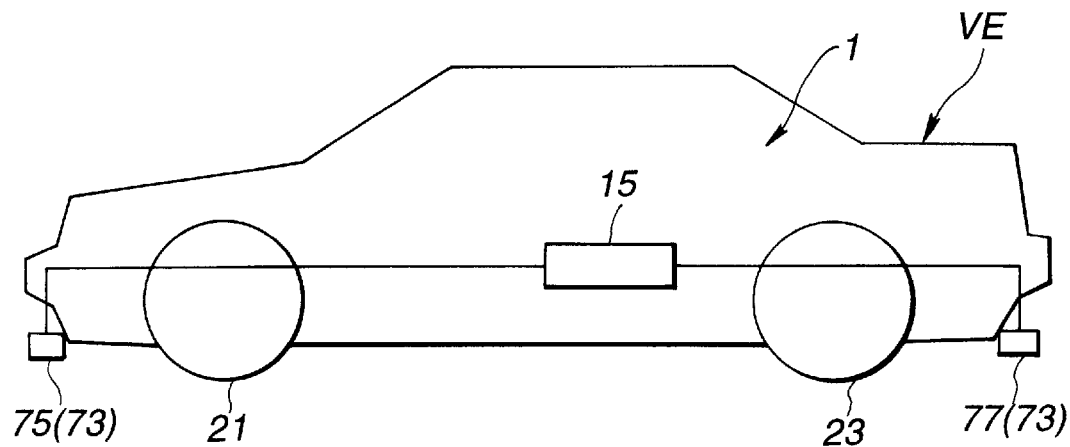
FIG. 5A is a schematic structural view of the automotive vehicle equipped with the road curvature estimating apparatus of a second embodiment according to the present invention as viewed from a side direction.
Figure 5B:
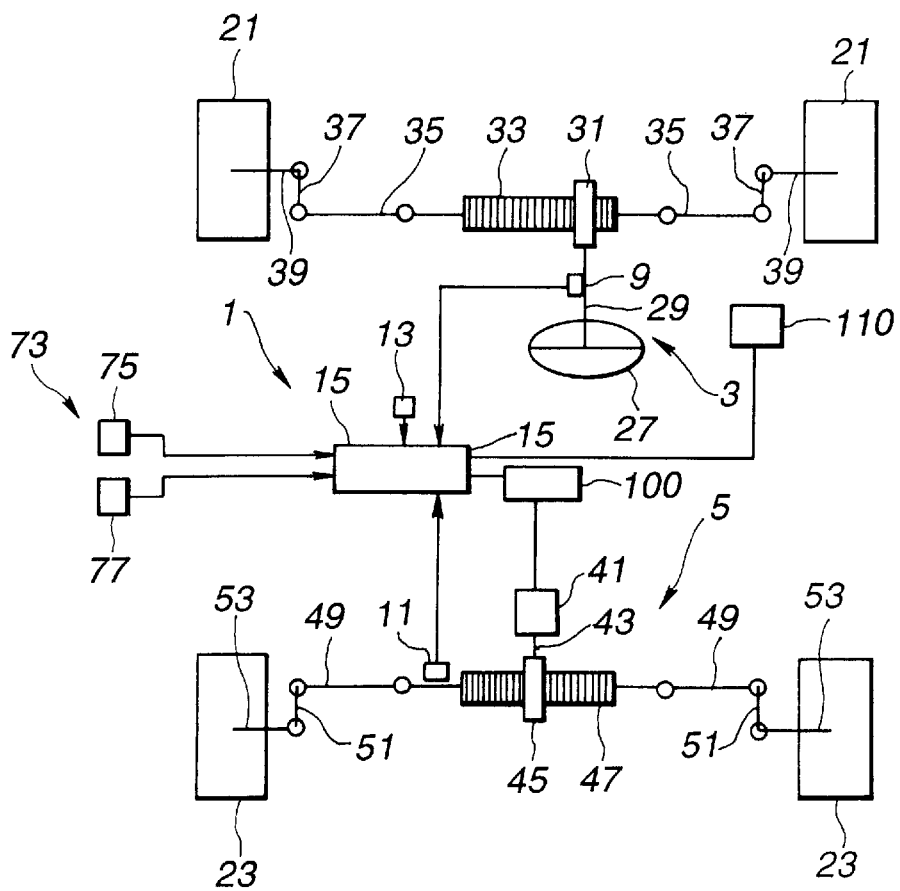
FIG. 5B is a schematic structural view of the automotive vehicle of FIG. 5A as viewed from a top direction.

As is clear from the Laplace transformation of the equation (4), v is an inverse number of the time constant. Therefore, when the value of v becomes smaller, it means that the curvature of the road becomes changeless. Since there is a tendency that when the vehicle speed is relatively high the automotive vehicle VE is traveling on a road having a changeless curvature such as a high way, it is assumed that $\lambda$ is changed according to the change of the vehicle speed as shown in FIG. 4. That is, higher the vehicle speed v becomes, smaller $\lambda$ becomes. Since the time constant is the inverse number of $\lambda$, the time constant is increased according to the increase of the vehicle speed.

By substituting the equation (4) into the equations (1) and (2), the equations (5) and (6) are obtained.

$$\frac{d}{dt}\begin{bmatrix} r \\ \beta \\ \Delta\Psi \\ \Delta y \\ \rho \end{bmatrix} = \overbrace{\begin{bmatrix} a_{11} & a_{12} & 0 & 0 & 0 \\ a_{21} & a_{22} & 0 & 0 & 0 \\ 1 & 0 & 0 & 0 & -v \\ 1s & v & v & 0 & 0 \\ 0 & 0 & 0 & 0 & -\lambda \end{bmatrix}}^{A}\overbrace{\begin{bmatrix} r \\ \beta \\ \Delta\Psi \\ \Delta y \\ \rho \end{bmatrix}}^{x} + \underbrace{\begin{bmatrix} b_{11} & b_{12} \\ b_{21} & b_{22} \\ 0 & 0 \\ 0 & 0 \\ 0 & 0 \end{bmatrix}}_{B}\overbrace{\begin{bmatrix} \partial f \\ \partial r \end{bmatrix}}^{u} + \begin{bmatrix} 0 \\ 0 \\ 0 \\ 0 \\ 1 \end{bmatrix}v \quad (5)$$

-continued $$\Delta y = \begin{bmatrix} 0 & 0 & 0 & 1 & 0 \end{bmatrix} \overbrace{\begin{bmatrix} r \\ \beta \\ \Delta \Psi \\ \Delta y \\ \rho \end{bmatrix}}^{x} + \overbrace{\begin{bmatrix} 0 & 0 \end{bmatrix}}^{D} \overbrace{\begin{bmatrix} \partial f \\ \partial r \end{bmatrix}}^{u} \quad (6)$$

The matrixes A, B, C and D in FIG. 3 correspond to the matrixes A, B, C and D of the system in the equations (5) and (6).

$$A = \begin{bmatrix} a_{11} & a_{12} & 0 & 0 & 0 \\ a_{21} & a_{22} & 0 & 0 & 0 \\ 1 & 0 & 0 & 0 & -v \\ 1s & v & v & 0 & 0 \\ 0 & 0 & 0 & 0 & -\lambda \end{bmatrix} \quad (7)$$

$$B = \begin{bmatrix} b_{11} & b_{12} \\ b_{21} & b_{22} \\ 0 & 0 \\ 0 & 0 \\ 0 & 0 \end{bmatrix}$$

$$C = \begin{bmatrix} 0 & 0 & 0 & 1 & 0 \end{bmatrix}$$

$$D = \begin{bmatrix} 0 & 0 \end{bmatrix}$$

The matrix L in FIG. 3 is called as a feedback coefficient of the output error. By increasing this value, the convergence of the estimated value to the real value is promoted, but the measured value such as a lateral displacement becomes sensitive to noises. Herein, there is shown a design example of the Kalman filter based on the dispersion of the input and output noises. Defining the dispersion of v and the measured lateral displacement $\Delta y$ as $\Gamma$ and $\Sigma$, L is calculated by the following equation.

$$L = PC^T \Sigma^{-1} \quad (8)$$

wherein it is assumed that P satisfies the following equation.

$$AP + PA^T + \Gamma - PC^T \Sigma^{-1} CP = 0 \quad (9)$$

As is clear from the equations (7), (8) and (9), the matrixes A, B, C and D and the matrix D function as parameters which vary according to the vehicle speed.

The adder 69 in FIG. 3 functions to correct the offset from the measured lateral displacement $\Delta y$ and to reflect it in x. Since the coefficient L is large, the amount of the difference is feedbacked to promote the convergent to the real value.

By receiving the measured front and rear wheel steer angles u, the measured lateral displacement $\Delta y$ and the vehicle speed v at the road curvature calculator 15 in FIG. 3, the road curvature $\rho$ is outputted together with the yaw rate r, the lateral slip angle $\beta$, the yaw angle $\Delta \Psi$ and the lateral displacement $\Delta y$. By controlling the electric motor 41 upon using these outputs, it becomes possible to smoothly execute the traveling of a curved road. Further, since the road curvature $\rho$ is calculated by the state estimation of the modern control theory without employing the image processing, the calculating time becomes extremely short and therefore the delay of the calculating time is almost not caused even if the outputted road curvature $\rho$ is employed in the automatic steer control. Accordingly, it becomes possible to execute an extremely accurate traveling of a curved road.

Referring to FIGS. 5A to 9, there is shown a second embodiment of the road curvature estimating apparatus according to the present invention. The second embodiment is generally similar to the first embodiment except that a vehicle angle measuring means 73 is employed instead of the lateral displacement measuring means 7 of the first embodiment.

Figure 6:
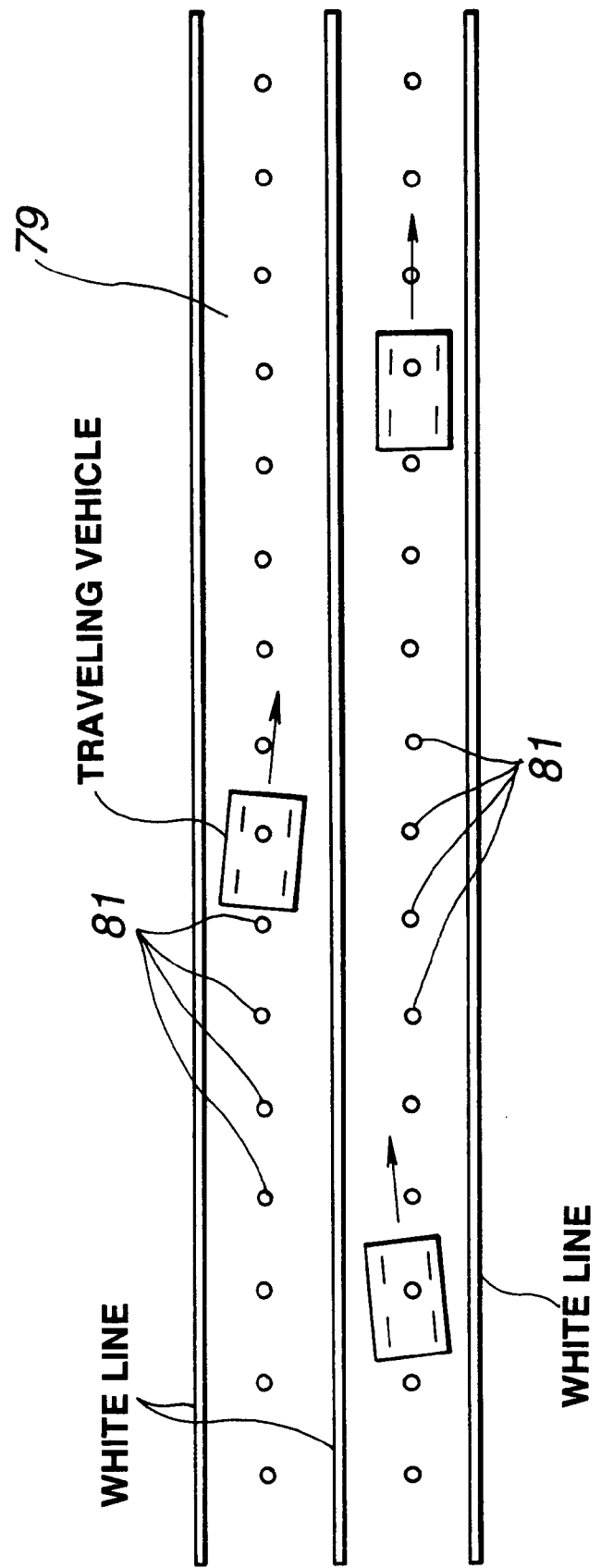
FIG. 6 is a plan view of a road in which magnetic nails are installed according to the second embodiment.
Figure 7:
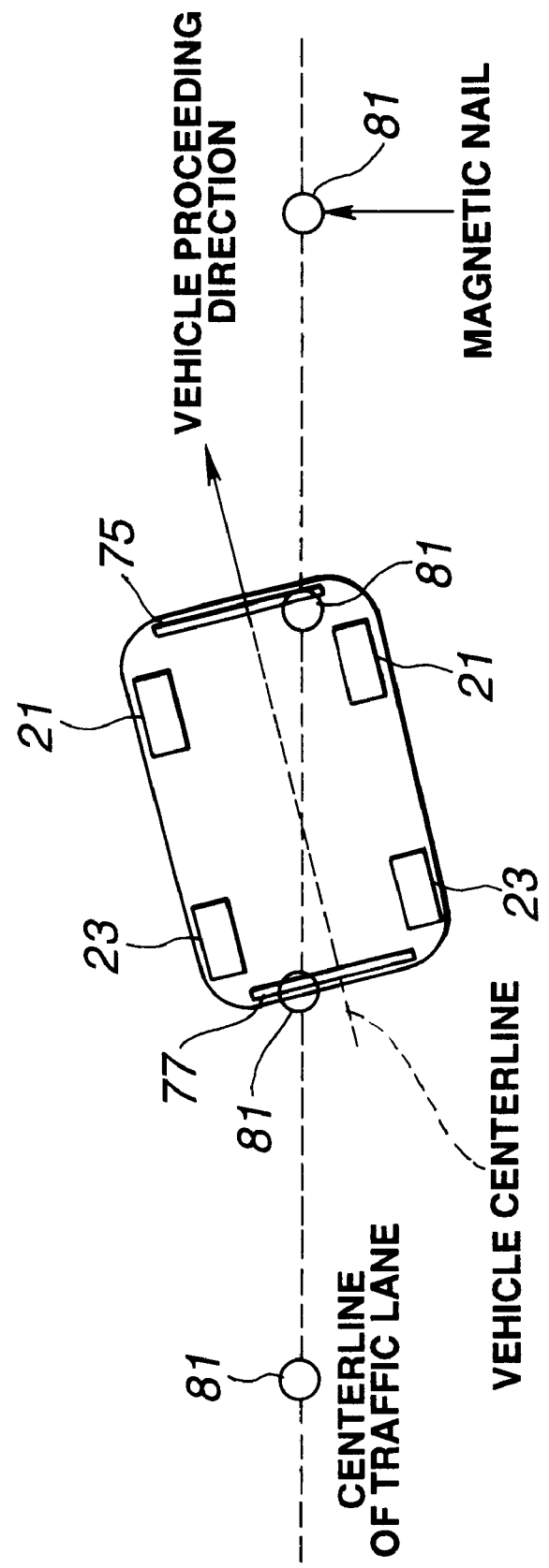
FIG. 7 is an enlarged plan view of an essential part, which view shows a relationship between a magnetic nail sensor and the magnetic nails.

The vehicle angle measuring means 73 is constituted by a front and rear magnetic nail sensors 75 and 77 installed at front and rear end portions of the automotive vehicle VE, respectively. The front and rear magnetic nail sensors 75 and 77 are arranged to detect magnetic energy of magnetic nails 81 embedded in a road 79 at predetermined intervals (about 2 m) as shown in FIGS. 6 and 7.

By measuring the lateral displacements $\Delta yf$, $\Delta yr$ of the front and rear magnetic nail sensors 75 and 77 with respect to the magnetic nails 81 and by setting a distance between the sensors 75 and 77 as $H_{-ss}$, the angle of the longitudinal direction of the automotive vehicle VE with respect to a direction along a road ahead of the automotive vehicle VE, that is, the yaw angle $\Delta \Psi$ is calculated from $\Delta \Psi = \arctan\{(\Delta yf - \Delta yr)/H_{-ss}\}$.

Figure 8:
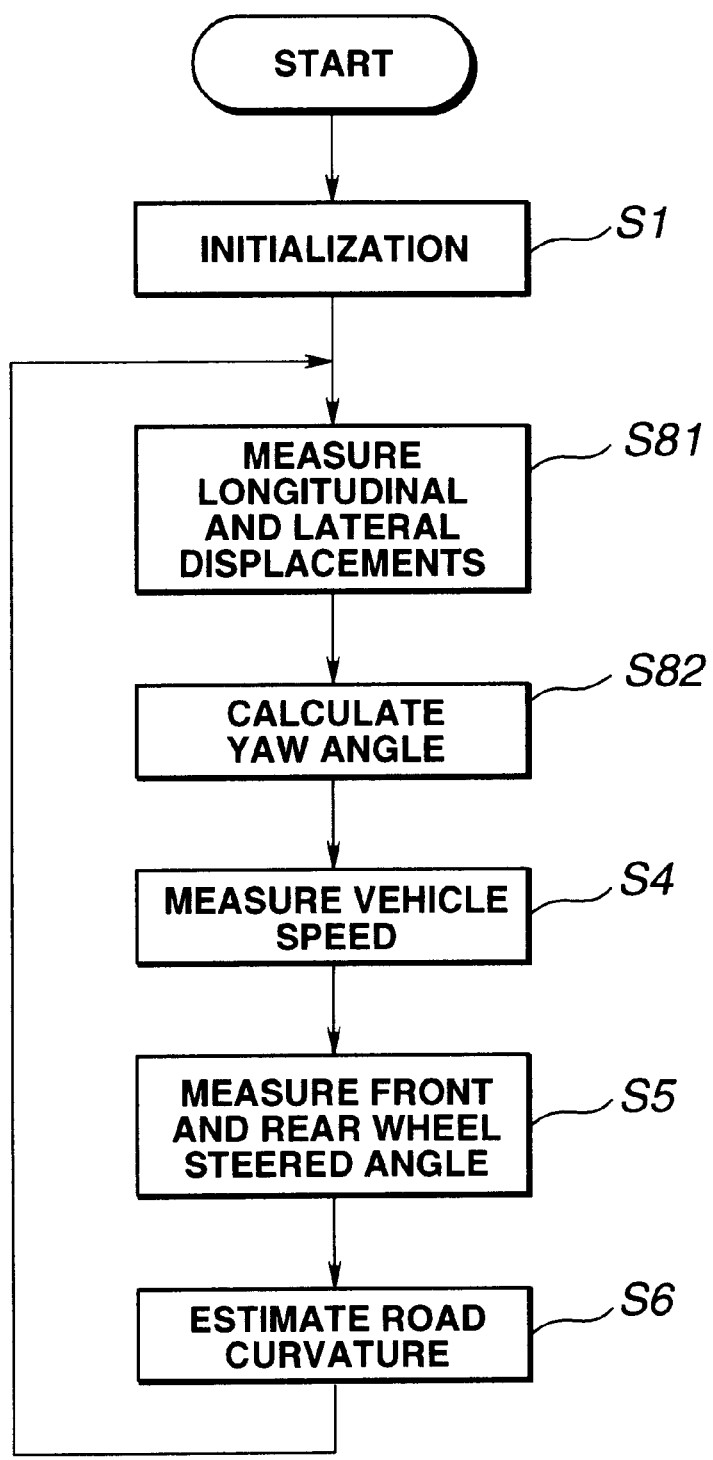
FIG. 8 is a flowchart an estimating process executed by the road curvature estimating apparatus of the second embodiment.

The estimation of the road curvature $\rho$ is executed as follows to a flowchart of FIG. 8. This flowchart corresponds to the flowchart of FIG. 2 of the first embodiment. In the flowchart of FIG. 8, a front and rear displacement measuring process of a step S81 and a yaw angle calculating process of a step S82 are executed instead of the steps S2 and S3 of FIG. 2. By these processes, the road curvature calculator 15 in FIG. 9 receives the yaw angle measured value $\Delta \Psi$, and therefore it becomes possible to execute the estimation of the road curvature $\rho$ as is similar to that of the first embodiment.

Figure 9:
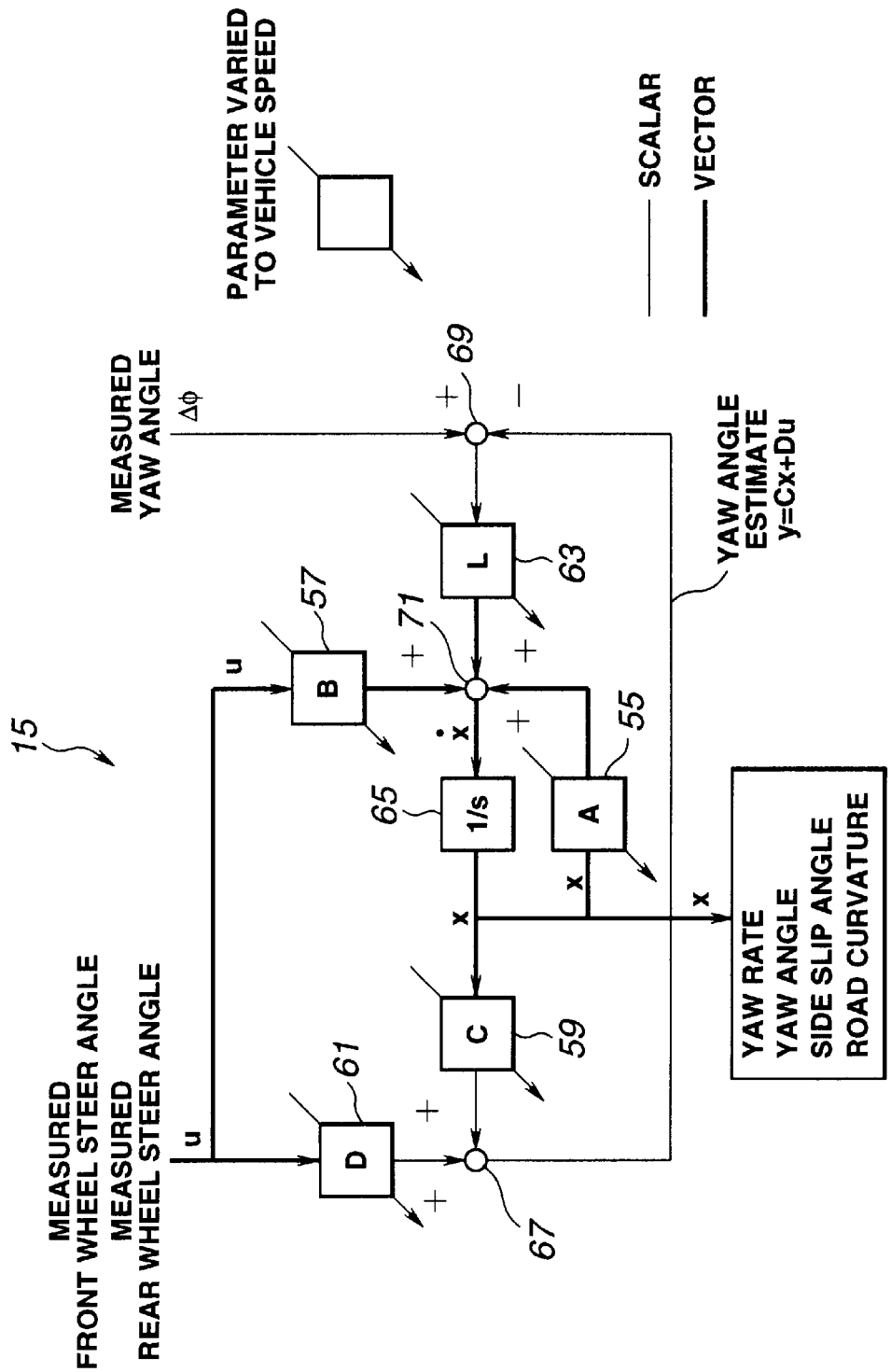
FIG. 9 is a block diagram of a road curvature calculator employed in the second embodiment.

That is, the road curvature calculator 15 in FIG. 9 is different from the road curvature calculator 15 in FIG. 3 of the first embodiment in the fact that the measured lateral displacement $\Delta y$ is replaced with the measured yaw angle $\Delta \Psi$. Accordingly, it becomes possible that the road curvature calculator 15 of FIG. 9 measures the front and rear steer angles u, the yaw angle $\Delta \Psi$ and the vehicle speed v and calculates the road curvature $\rho$ together with the yaw rate r, the yaw angle $\Delta \Psi$ and the lateral slip angle $\beta$ on the basis of the measured values.

In the second embodiment, each matrix A, B, C, D, L is determined generally as is similar to those of the first embodiment. That is, by employing a two-wheel model which is generally used for studying the steering stability as a vehicle model, the equation of this vehicle model is shown as follows.

$$\frac{d}{dt} \begin{bmatrix} r \\ \beta \\ \Delta \Psi \end{bmatrix} = \begin{bmatrix} a_{11} & a_{12} & 0 \\ a_{21} & a_{22} & 0 \\ 1 & 0 & 0 \end{bmatrix} \begin{bmatrix} r \\ \beta \\ \Delta \Psi \end{bmatrix} + \begin{bmatrix} b_{11} & b_{12} \\ b_{21} & b_{22} \\ 0 & 0 \end{bmatrix} \begin{bmatrix} \partial f \\ \partial r \end{bmatrix} + \begin{bmatrix} 0 \\ 0 \\ -v \end{bmatrix} \rho \quad (10)$$

$$\Delta y = \begin{bmatrix} 0 & 0 & 1 \end{bmatrix} \begin{bmatrix} r \\ \beta \\ \Delta \Psi \end{bmatrix} \quad (11)$$

wherein the road curvature $\rho$ is an input to the system. Since the meaning of each mark is the same as that of the first embodiment, the explanation thereof is omitted herein.

The road curvature $\rho$ is approximated by the linear system model driven by white noise as is similar to that of the first embodiment.

$$\rho = -\lambda \rho + v \quad (12)$$

By substituting the equation (12) into the equations (10) and (11), the equations (13) and (14) are obtained.

$$\frac{d}{dt}\begin{bmatrix} r \\ \beta \\ \Delta\Psi \\ \rho \end{bmatrix} = \begin{bmatrix} a_{11} & a_{12} & 0 & 0 \\ a_{21} & a_{22} & 0 & 0 \\ 1 & 0 & 0 & -v \\ 0 & 0 & 0 & -\lambda \end{bmatrix} \begin{bmatrix} r \\ \beta \\ \Delta\Psi \\ \rho \end{bmatrix} + \begin{bmatrix} b_{11} & b_{12} \\ b_{21} & b_{22} \\ 0 & 0 \\ 0 & 0 \end{bmatrix} \begin{bmatrix} \partial f \\ \partial r \end{bmatrix} + \begin{bmatrix} 0 \\ 0 \\ 0 \\ 1 \end{bmatrix} \nu \quad (13)$$

$$\Delta\Psi = [0 \ 0 \ 1 \ 0] \begin{bmatrix} r \\ \beta \\ \Delta\Psi \\ \rho \end{bmatrix} + [0 \ 0] \begin{bmatrix} \partial f \\ \partial r \end{bmatrix} \quad (14)$$

The matrixes A, B, C and D in FIG. 9 correspond to the matrixes A, B, C and D in the system of the equations (13) and (14). That is, $$A = \begin{bmatrix} a_{11} & a_{12} & 0 & 0 \\ a_{21} & a_{22} & 0 & 0 \\ 1 & 0 & 0 & -v \\ 0 & 0 & 0 & -\lambda \end{bmatrix}$$

$$B = \begin{bmatrix} b_{11} & b_{12} \\ b_{21} & b_{22} \\ 0 & 0 \\ 0 & 0 \end{bmatrix}$$

$$C = [0 \ 0 \ 1 \ 0]$$

$$D = [0 \ 0] \quad (15)$$

A design example of the Kalman filter with respect to the matrix L in FIG. 9 is the same as that in the first embodiment, based on the dispersion of the input and output noises will be shown. Defining the dispersions of ν and the measured lateral displacement as Γ and Σ, L is calculated by the following equation.

$$L = PC^T \Sigma^{-1} \quad (16)$$

Wherein it is aussmed that P satisfied the following equation.

$$AP + PA^T + \Gamma - PC^T\Sigma^{-1}CP = 0 \quad (17)$$

As is clear from the equations (15), (16) and (17), the matrixes A, B, C and D and the matrix D are parameters which vary according to the vehicle speed.

Accordingly, The present embodiment ensures the operation and advantages as is generally same as those of the first embodiment. Further, since the second embodiment does not use an image from a camera, it is expected to perform an accurate operation even under a bad weather condition.

By taking the output of the front magnetic nail sensor 75 as a forward gazing point lateral displacement, the second embodiment is constructed as is the same as the first embodiment. Further, in case that a magnetic nail sensor is employed in the first embodiment to measure the forward gazing point, it improves a durability to bad weather and ensures the advantage such that one magnetic nail sensor satisfies it as compared with the second embodiment.

Referring to FIG. 10, there is shown the road curvature calculator employed in a third embodiment according to the present invention. This third embodiment is arranged such that the road curvature is calculated on the basis of the information of the lateral displacement in addition to the yaw angle, the vehicle speed and the front and rear wheel steer angles. In this third embodiment, the whole construction may be constructed as same as that of the second embodiment of FIG. 5, and one of the outputs of the front and rear magnetic nail sensors 75 and 77 is employed as a lateral displacement. Further, the lateral displacement of the gravity point may be calculated on the basis of these outputs. In case of the lateral displacement of the gravity point, it is necessary that positional relationship between the measured points of the magnetic nail sensors 75 and 77 and the gravity point of the automotive vehicle VE is clear.

With the third embodiment, the estimation of the road curvature is executed by a flowchart as is similar to that of FIG. 8, each matrix is set as is similar to the above-mentioned embodiment and as follows.

By employing the two wheel model which is generally used for studying the steering stability, as a vehicle model, the equation is represented hereinafter.

$$\frac{d}{dt}\begin{bmatrix} r \\ \beta \\ \Delta\Psi \\ \Delta y \end{bmatrix} = \begin{bmatrix} a_{11} & a_{12} & 0 & 0 \\ a_{21} & a_{22} & 0 & 0 \\ 1 & 0 & 0 & 0 \\ 1s & v & v & 0 \end{bmatrix} \begin{bmatrix} r \\ \beta \\ \Delta\Psi \\ \Delta y \end{bmatrix} + \begin{bmatrix} b_{11} & b_{12} \\ b_{21} & b_{22} \\ 0 & 0 \\ 0 & 0 \end{bmatrix} \begin{bmatrix} \partial f \\ \partial r \end{bmatrix} + \begin{bmatrix} 0 \\ 0 \\ -v \\ 0 \end{bmatrix} \rho \quad (18)$$

$$\begin{bmatrix} \Delta\Psi \\ \Delta t \end{bmatrix} = \begin{bmatrix} 0 & 0 & 1 & 0 \\ 0 & 0 & 0 & 1 \end{bmatrix} \begin{bmatrix} r \\ \beta \\ \Delta\Psi \\ \Delta y \end{bmatrix} \quad (19)$$

wherein a gazing point is that the lateral displacement of the front or rear magnetic nail sensor 75, 77 is represented as Δy. Therefore, ls in the equation (18) is a distance from a gravity point of the vehicle VE to the front or rear magnetic nail sensor 75, 77. The reference mark is defined such that the forward portion of the vehicle VE is plus. It is certain that the lateral displacement Δy may be the lateral displacement of the forward gazing point by the image processing. In this case, the forward gazing point distant is ls.

The road curvature is approximated by the linear system model driven by white noises as is the same as that in the first embodiment.

$$\rho = -\lambda\rho + \nu \quad (20)$$

By substituting the equation (20) into the equations (18) and (19), the equations (21) and (22) are obtained.

$$\frac{d}{dt}\begin{bmatrix} r \\ \beta \\ \Delta\Psi \\ \Delta y \\ \rho \end{bmatrix} = \begin{bmatrix} a_{11} & a_{12} & 0 & 0 & 0 \\ a_{21} & a_{22} & 0 & 0 & 0 \\ 1 & 0 & 0 & 0 & -v \\ 1s & v & v & 0 & 0 \\ 0 & 0 & 0 & 0 & -\lambda \end{bmatrix}\begin{bmatrix} r \\ \beta \\ \Delta\Psi \\ \Delta y \\ \rho \end{bmatrix} + \begin{bmatrix} b_{11} & b_{12} \\ b_{21} & b_{22} \\ 0 & 0 \\ 0 & 0 \\ 0 & 0 \end{bmatrix}\begin{bmatrix} \partial f \\ \partial r \end{bmatrix} + \begin{bmatrix} 0 \\ 0 \\ 0 \\ 0 \\ 1 \end{bmatrix}v \quad (21)$$

$$\Delta y = \begin{bmatrix} 0 & 0 & 1 & 0 & 0 \\ 0 & 0 & 0 & 1 & 0 \end{bmatrix}\begin{bmatrix} r \\ \beta \\ \Delta\Psi \\ \Delta y \\ \rho \end{bmatrix} + \begin{bmatrix} 0 & 0 \\ 0 & 0 \end{bmatrix}\begin{bmatrix} \partial f \\ \partial r \end{bmatrix} \quad (22)$$

The matrixes A, B, C and D in FIG. 10 correspond to the matrixes A, B, C and D of the system of the equations (21) and (22). That is, $$A = \begin{bmatrix} a_{11} & a_{12} & 0 & 0 & 0 \\ a_{21} & a_{22} & 0 & 0 & 0 \\ 1 & 0 & 0 & 0 & -v \\ 1s & v & v & 0 & 0 \\ 0 & 0 & 0 & 0 & -\lambda \end{bmatrix} \quad (23)$$

$$B = \begin{bmatrix} b_{11} & b_{12} \\ b_{21} & b_{22} \\ 0 & 0 \\ 0 & 0 \\ 0 & 0 \end{bmatrix}$$

$$C = \begin{bmatrix} 0 & 0 & 1 & 0 & 0 \\ 0 & 0 & 0 & 1 & 0 \end{bmatrix}$$

$$D = \begin{bmatrix} 0 & 0 \\ 0 & 0 \end{bmatrix}$$

A design example of the Kalman filter with respect to the matrix L in FIG. 10 is the same as that of the above-mentioned embodiment. Defining the dispersions of v and the measured lateral displacement as Γ and Σ, L is calculated by the following equation.

$$L = PC^T\Sigma^{-1} \quad (24)$$

wherein it is assumed that P satisfies the following equation.

$$AP + PA^T\Gamma - PC^T\Sigma^{-1}CP = 0 \quad (25)$$

As is clear from the equations (23), (24) and (25), references A, B, C and D and L are parameters which vary according to the vehicle speed.

Accordingly, with the present embodiment, it becomes possible to calculating the road curvature ρ together with the yaw rate r, the yaw angle ΔΨ, the lateral slip angle β and the lateral displacement Δy on the basis of the front and rear steer angle measured values u, the measured lateral displacement Δy, the measured yaw angle ΔΨ and the vehicle speed v.

Accordingly, the second embodiment ensures the operation and advantage as similar to those of the first embodiment.

Further, since the image from a camera is not employed as is similar to the second embodiment, it is possible to accurately operate even under bad weather condition. Since the sensor information is greater than that of the first and second embodiments, it is possible to improve the reliability of the estimation value and to execute an accurate control.

Although the above-mentioned embodiments have been adapted to the automatic steering, it will be understood that they may be applied to 4WS system.

With thus arranged road curvature estimating apparatus according to the present invention, since the state estimation of the modern control theory is executed on the basis of the detected attitude of the vehicle with respect to the road, the front and rear wheel steer angles, and the vehicle speed, it is not necessary to utilize the image processing, and it becomes possible to execute the quick calculation. For example, in a case of the vehicle employing an automatic steering, the control thereof becomes stable and therefore smooth and accurate traveling is realized.

What is claimed is:

1. A road curvature estimating apparatus installed in a vehicle comprising:
   lateral displacement measuring means for measuring a lateral displacement of a vehicle with respect to a road;
   wheel steer angle measuring means for measuring steer angles of front and rear wheels of the vehicle;
   vehicle speed measuring means for measuring a vehicle speed of the vehicle; and
   road curvature calculating means for calculating a curvature of a road ahead of the vehicle on the basis of the measured lateral displacement, the measured vehicle speed and the measured steer angles of the front and rear wheels by means of a state estimation of modern control theory.

2. A road curvature estimating apparatus installed in a vehicle comprising:
   vehicle angle measuring means for measuring an angle of a longitudinal direction of the vehicle with respect to a road ahead of the vehicle;
   wheel steer angle measuring means for measuring steer angles of front and rear wheels of the vehicle;
   vehicle speed measuring means for measuring a vehicle speed of the vehicle; and
   road curvature calculating means for calculating a curvature of a road ahead of the vehicle on the basis of the angle measured by said vehicle angle measuring means, the measured vehicle speed and the measured steer angles of the front and rear wheels by means of a state estimation of modern control theory.

3. A road curvature estimating apparatus installed in a vehicle comprising:
   lateral displacement measuring means for measuring a lateral displacement of a vehicle with respect to a road;
   vehicle angle measuring means for measuring an angle of a longitudinal direction of a vehicle with respect to a road ahead of the vehicle;
   wheel steer angle measuring means for measuring steer angles of front and rear wheels of the vehicle;
   vehicle speed measuring means for measuring a vehicle speed of the vehicle; and
   road curvature calculating means for calculating a curvature of a road ahead of the vehicle on the basis of the measured lateral displacement, the measured vehicle angle, the measured vehicle speed and the measured steer angles of the front and rear wheels by means of a state estimation of modern control theory.

4. The road curvature estimating apparatus as claimed in claim 1, wherein the road curvature calculating means includes a linear system model which is driven by noises to approximate the road curvature.

5. The road curvature estimating apparatus as claimed in claim 4, wherein a time constant of the linear system model is increased according to the increase of the vehicle speed.

6. The road curvature estimating apparatus as claimed in claim 1, further comprising a controlling means for controlling an automatic steering mechanism of the vehicle on the basis of the road curvature calculated by said road curvature means.

7. The road curvature estimating apparatus as claimed in claim 1, further comprising a displaying means displaying the calculated road curvature to a driver of the vehicle.

8. A road curvature estimating apparatus installed in a vehicle comprising:

a vehicle attitude detector detecting an attitude of the vehicle with respect to a road;

a wheel steer angle detector detecting steer angles of front and rear wheels of the vehicle;

a vehicle speed detector detecting a vehicle speed of the vehicle;

a road curvature calculator calculating a curvature of a road ahead of the vehicle on the basis of the measured vehicle attitude, the measured vehicle speed and the measured steer angles of the front and rear wheels by means of a state estimation of modern control theory; and a controller controlling an automatic steering mechanism of the vehicle on the basis of the road curvature calculated by said road curvature.

9. A road curvature estimating apparatus installed in a vehicle comprising:

a vehicle attitude detector detecting an attitude of the vehicle with respect to a road;

a wheel steer angle detector detecting steer angles of front and rear wheels of the vehicle;

a vehicle speed detector detecting a vehicle speed of the vehicle;

a road curvature calculator calculating a curvature of a road ahead of the vehicle on the basis of the measured vehicle attitude, the measured vehicle speed and the measured steer angles of the front and rear wheels by means of a state estimation of modern control theory; and a monitor displaying the calculated road curvature.

10. The road curvature estimating apparatus as claimed in claim 8, wherein said vehicle attitude detector includes at least one of a lateral displacement measuring device for measuring a lateral displacement of a vehicle with respect to a road and a vehicle angle measuring device for measuring an angle of a longitudinal direction of a vehicle with respect to a road ahead of the vehicle.

* * * * *